United States Patent Office 2,852,504
Patented Sept. 16, 1958

2,852,504
2-AMINO-4-ALKYLSULFONYL-5-NITROTHIAZOLE AZO COMPOUNDS

Edmund B. Towne, Joseph B. Dickey, and Melvin S. Bloom, Kingsport, Tenn., assignors to Eastman Kodak Company, Rochester, N. Y., a corporation of New Jersey No Drawing. Application February 23, 1955
Serial No. 490,113

5 Claims. (Cl. 260—158)

This invention relates to new 5-nitrothiazole compounds, to new monoazo compounds prepared from the new 2-amino-4-alkylsulfonyl-5-nitrothiazole compounds of our invention, to the process for preparing our new 5-nitrothiazole compounds and to the application of our new azo compounds to the art of dyeing or coloring.

The new monoazo compounds of our invention, which are free of water-solubilizing groups, have the formula:

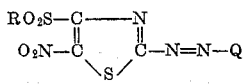

wherein R represents an alkyl group and Q represents an aniline coupling component joined to the azo bond through the carbon atom in the para position to its amino nitrogen atom, the radical of a cyclohexanedione-1,3 joined to the azo bond through the carbon atom in its 2-positioon, the radical of p-cresol, the radical of a dihydroxybenzene and the radical of a dihydroxybenzene monoalkyl ether and wherein the term alkyl as used above refers to an alkyl hydrocarbon group having 1 to 4 carbon atoms. They are useful for coloring cellulose alkyl carboxylic acid esters having 2 to 4 carbon atoms in the acid groups thereof, nylon, wool, acrylonitrile graft polymers, and polyesters, such as polyethylene terephthalate. Ordinarily they are applied to textile materials made of said materials although in the case of the synthetic materials coloration can also be effected, for example, by incorporating the azo compounds into the spinning dope and spinning the fiber as usual. Generally speaking the dyeings obtained have excellent dischargeability and resistance to sublimation and good fastness to gas.

The new azo compounds of our invention are prepared by diazotizing a 2-amino-4-alkylsulfonyl-5-nitrothiazole compound having the formula:

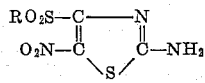

wherein R represents an alkyl group having 1 to 4 carbon atoms and coupling the diazonium compound obtained with p-cresol, the aniline, the cyclohexanedione-1,3, the dihydroxybenzene or the dihydroxybenzene monoalkyl ether coupling components shown herein.

2-Amino-4-methylsulfonyl-5-nitrothiazole, 2-amino-4-ethylsulfonyl-5-nitrothiazole, 2-amino-4-n-propylsulfonyl-5-nitrothiazole, 2-amino-4-isopropylsulfonyl-5-nitrothiazole and 2-amino-4-n-butylsulfonyl-5-nitrothiazole are representative of the 5-nitrothiazole compounds used in the preparation of the azo compounds of our invention.

The aniline coupling components, which are free of water-solubilizing groups, used in the preparation of the azo compounds of our invention are represented for the most part by the formula:

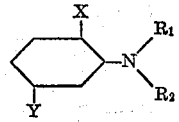

wherein $R_1$ and $R_2$ each represent an alkyl group having 1 to 4 carbon atoms, a hydroxyalkyl group having 2 to 4 carbon atoms, an alkoxyalkyl group having 3 to 4 carbon atoms, a β-cyanoethyl group, a β-carbomethoxyethyl group, a β-carboethoxyethyl group, a 2,2-difluoroethyl group, a 2,2-difluoropropyl group, a 3,3-difluoropropyl group, a 3,3-difluorobutyl group, a 4,4-difluoroamyl group, a 2,2,2-trifluoroethyl group, a 3,3,3-trifluoropropyl group or a 4,4,4-trifluorobutyl group and wherein $R_1$ in addition represents a hydrogen atom, X represents a hydrogen atom, a methyl group, a methoxy group, an ethoxy group, a chlorine atom or a bromine atom and Y represents a hydrogen atom, a methyl group, a methoxy group, an ethoxy group, a chlorine atom, a bromine atom, an acetylamino group, a propionylamino group or a butyrylamino group.

Illustrative of the alkyl groups represented by R, $R_1$ and $R_2$ are the methyl, the ethyl, the n-propyl, the isopropyl and the n-butyl groups. Similarly, the β-hydroxyethyl, the β-hydroxypropyl, the γ-hydroxypropyl, the β,γ-dihydroxypropyl, the β-methyl-β,γ-dihydroxypropyl and the δ-hydroxybutyl groups are illustrative of the hydroxyalkyl groups $R_1$ and $R_2$ represent. Illustrative of the alkoxyalkyl groups represented by $R_1$ and $R_2$ are the β-methoxyethyl and the β-ethoxyethyl groups.

Typical of the aniline coupling components used in the preparation of the azo compounds or our invention are aniline, m-toluidine, m-anisidine, m-chloroaniline, 2-methoxy-5-chloroaniline, 2,5-dimethoxyaniline, 2-methoxy-5-methylaniline, N-β-hydroxyethylaniline, N-β-hydroxyethyl-o-chloroaniline, N-β-hydroxyethyl-m-toluidine, N-methylaniline, N-methyl-m-toluidine, N-methyl-m-chloroaniline, N-ethylaniline, N-ethyl-m-toluidine, N-ethyl-m-chloroaniline, N-n-propylaniline, N-n-propyl-m-toluidine, N-isopropylaniline, N-isopropyl-m-toluidine, N-n-butylaniline, N-n-butyl-m-toluidine, N-β-cyanoethylaniline, N-β-cyanoethyl-m-toluidine, N,N-di-β-hydroxyethylaniline, N,N - di - β - hydroxyethyl-m-chloroaniline, N,N-di-β-hydroxyethyl-m-toluidine, N-ethyl-N-β-hydroxyethylaniline, N-ethyl-N-β-hydroxyethyl-m-toluidine, N-n-butyl-N-δ-hydroxybutylaniline, N-n-butyl-N-β-hydroxyethyl-m-toluidine, N-ethyl-N-β,γ-dihydroxypropylaniline, N-ethyl-N-γ-hydroxypropylaniline, N-ethyl-N-γ-hydroxypropyl-m-toluidine-, N-ethyl-N-δ-hydroxybutylaniline, N-ethyl-N-δ-hydroxybutyl-m-toluidine, N-ethyl-N-β,γ-dihydroxypropyl-m-toluidine, N-ethyl-N-(β-methyl-β,γ-dihydroxypropyl)aniline, N-methyl-N-β,γ-dihydroxypropyl-m-toluidine, N - β-methoxyethyl-N-β,γ-dihydroxypropyl-m-toluidine, N-β-ethoxyethyl-N-β-hydroxyethyl-m-toluidine, N,N-di-β-hydroxyethyl-m-bromoaniline, N-ethyl-N-δ-hydroxybutylaniline, N-β-hydroxyethyl-N-2,2,2-trifluoroethylaniline, N - β - hydroxyethyl-N-3,3,3-trifluoropropylaniline,, N-β-hydroxyethyl-N-4,4,4-trifluorobutylaniline, N-β-hydroxyethyl-N-2,2-difluoroethylaniline, N-β-hydroxypropyl-N-3,3-difluoropropylaniline, N-β-hydroxyethyl-N-2,2-difluoropropylaniline, N-β,γ-dihydroxypropyl-N-3,3-difluorobutylaniline, N-β,γ-dihydroxypropyl-N-4,4-difluoroamylaniline, N-methyl-N-β-hydroxyethyl-m-bromoaniline, N,N-di-β-hydroxyethyl-2,5-diethoxyaniline, N,N-di-β-hydroxyethyl-2,5-dichloroaniline, N-n-propyl-N-β-hydroxyethylaniline, N-isopropyl-N-β-hydroxyethylaniline, N-n-butyl-N-β-hydroxyethylaniline, N-β-hydroxyethyl-N-β-cyanoethyl-m-chloroaniline, N-β-hydroxyethyl-N-γ-cyanopropylaniline, N-β-carbomethoxyethylaniline, N-β-carboethoxyethyl-N-β-hydroxyethylaniline and N-β-carbomethoxyethyl-N-β-hydroxyethyl-m-chloroaniline.

The cyclohexanedione-1,3 coupling compounds used in the preparation of the azo compounds of our invention are represented for the most part by the formula:

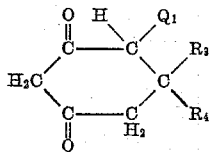

wherein $Q_1$ represents a hydrogen atom, a methoxy group, an ethoxy group, cyano group, a carbomethoxy group or a carboethoxy group and $R_3$ and $R_4$ each represents a hydrogen atom, a methyl group or an ethyl group.

Cyclohexanedione - 1,3; 5-methylcyclohexanedione-1,3; 5 - ethylcyclohexanedione - 1,3; 5,5 - dimethylcyclohexanedione-1,3; 5,5-diethylcyclohexanedione-1,3; 4-carbomethoxy - 5,5 - dimethylcyclohexanedione - 1,3; 4-carboethoxy - 5,5 - dimethylcyclohexanedione - 1,3; 4 - methoxy - 5,5 - dimethylcyclohexanedione - 1,3; 4 - ethoxy - 5,5 - dimethylcyclohexanedione - 1,3; 4 - methyl - 5,5 - dimethylcyclohexanedione - 1,3; 5 - phenylcyclohexanedione - 1,3; 4 - phenyl - 5 - phenylcyclohexanedione - 1,3; 4 - cyano - 5 - phenylcyclohexanedione - 1,3; 4 - cyano - 6 - methyl - 5 - phenylcyclohexanedione - 1,3; 5-cinnamyl-6 - carboethoxycyclohexanedione - 1,3; 4 - cyano - 5,5-dimethylcyclohexanedione-1,3; 4 - cyano - 5,5 - diethylcyclohexanedione - 1,3; 4-methoxycyclohexanedione-1,3; 4 - ethoxycyclohexanedione - 1,3; 4 - carbomethoxycyclohexanedione - 1,3; 4 - carboethoxycyclohexanedione-1,3; 4 - methoxy - 5,5 - diethylcyclohexanedione - 1,3; 4 - ethoxy - 5,5 - diethylcyclohexanedione - 1,3; 4 - carbomethoxy - 5,5 - diethylcyclohexanedione - 1,3; 4 - carboethoxy - 5,5 - diethylcyclohexanedione - 1,3; 4 - n - amylcyclohexanedione - 1,3; 5 - n - amylcyclohexanedione-1,3; 4,6 - dibromo - 5,5 - dimethylcyclohexanedione - 1,3; 5-(1 - ethylpropyl) - cyclohexanedione - 1,3 and 5 - (p - hydroxyphenyl) - cyclohexanedione - 1,3 are illustrative of the cyclohexanedione-1,3 compounds used in the preparation of the azo compounds of our invention. The use of 5,5-dimethylcyclohexanedione-1,3 appears to be advantageous.

p-Cresol, catechol, resorcinol, resorcinol monomethyl ether, resorcinol monoethyl ether, resorcinol mono-n-propylether, resorcinol mono-n-butyl ether, catechol monomethyl ether, catechol monoethyl ether, catechol mono-n-propyl ether, catechol mono-n-butyl ether, hydroquinone monomethyl ether, hydroquinone monoethyl ether, hydroquinone mono-n-propyl ether and hydroquinone mono-n-butyl ether are illustrative of the phenolic compounds used in the preparation of the azo compounds of our invention.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The azo compounds of our invention have varying utility for the dyeing or coloration of cellulose alkyl carboxylic acid esters having 2 to 4 carbon atoms in the acid groups thereof, nylon, wool, acrylonitrile graft polymers and polyesters such as polyethylene terephthalate.

The monoazo compounds of our invention are dyes for fibers prepared from graft polymers obtained by graft polymerizing acrylonitrile alone or together with one or more other monoethylenic monomers with a preformed polymer. The preformed polymer can be a homopolymer (a polymer prepared by polymerization of a single monomer) or it can be an interpolymer such as a copolymer ( a polymer prepared by the simultaneous polymerization in a single reaction mixture of two monomers) or a terpolymer (a polymer prepared by the simultaneous polymerization in a single reaction mixture of three monomers), or the like, and the graft polymers for which the dyes are particularly useful are those containing at least 5% by weight of combined acrylonitrile grafted to the preformed polymer molecule.

The graft polymers which can be dyed are thus polymers having direct placement of the polymerized monomeric units in the graft polymer molecule as distinguished from the random distribution obtained in interpolymers which are prepared by simultaneous polymerization of all of the monomeric materials in the polymer. The preformed polymer can be either a homopolymer of any of the well-known polymerizable monomers containing a single —CH=C< group and desirably a $CH_2$=C< group, or an interpolymer of two or more of such monomers; and the grafting can be effected with the preformed homopolymer or interpolymer in the polymerization mixture in which it was formed (i. e. a live polymer) or with the preformed polymer isolated from the polymerization mixture in which it was formed (i. e. a dead polymer).

The preformed polymer desirably is a homopolymer of a vinyl pyridine, an acrylamide, a maleamide, a fumaramide, an acrylate, a methacrylamide, a methacrylate, an itaconamide, a citraconamide, a fumaramate, an itaconamate, a citraconamate, a maleamate, or a vinyl ester; or an interpolymer of two or more of such monomers with each other or of at least one of such monomers with one or more different monoethylenic monomers characterized by a —CH=C< group such as styrene, acrylonitrile, substituted styrenes, vinyl or vinylidene chlorides, vinyl ethers, dialkyl maleates, alkenyl ketones, dialkyl fumarates, acrylic acid, methacrylic acid, substituted acrylonitriles, fumaronitrile, ethylene and the like.

The graft polymerization is effected by polymerizing acrylonitrile or a mixture of acrylonitrile with any other monoethylenic monomer, including any of the monomers enumerated hereinabove, with the preformed live or dead homopolymer or interpolymer whereby the acrylonitrile alone or together with another grafting monomer is combined with the preformed polymer molecule to give a graft polymer containing from 5 to 95% by weight of combined acrylonitrile.

The new azo compounds of our invention are of particular utility for dyeing fibers prepared from a graft polymer obtained by graft polymerizing acrylonitrile and an acrylamide or methacrylamide with a preformed copolymer of acrylonitrile and the same or different acrylamide or methacrylamide.

U. S. Patent 2,620,324 issued December 2, 1952, U. S. Patent 2,649,434 issued August 18, 1953 and U. S. Patent 2,657,191 issued October 27, 1953 discloses other typical graft polymers that can be dyed with the new azo compounds of our invention.

The 2-amino-4-alkyl sulfonyl-5-nitrothiazole compounds used in the preparation of the azo compounds of our invention are new compounds. They are prepared in accordance with the following series of reactions.

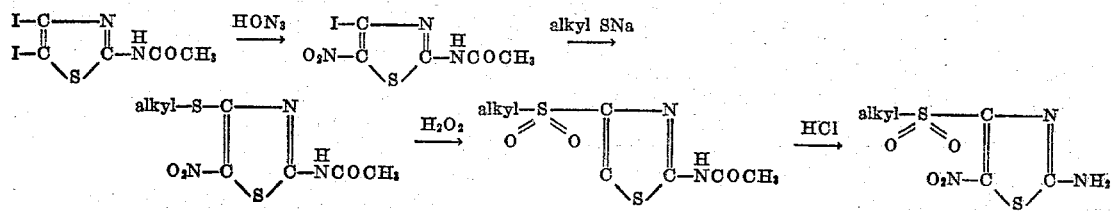

As seen from the foregoing 2-acetamido-4,5-diiodo-thiazole [JACS, 71, 4007 (1949)] is nitrated with nitric acid to obtain 2-acetamido-4-iodo-5-nitrothiazole which is reacted with a sodium alkyl mercaptide to form a 2-acetamido-4-alkylmercapto-5-nitrothiazole compound. This latter compound is treated with hydrogen peroxide to obtain a 2-acetamido-4-alkylsulfonyl-5-nitrothiazole compound which is hydrolyzed with hydrochloric acid to form the desired 2-amino-4-alkylsulfonyl-5-nitrothiazole compound. The preparation of the new 2-amino-4-alkylsulfonyl-5-nitrothiazole compounds will be illustrated with reference to the preparation of 2-amino-4-n-butylsulfonyl-5-nitrothiazole.

The following examples illustrate the new compounds of our invention and the manner in which they are prepared.

EXAMPLE 1

15.8 grams of 2-acetamido-4,5-diiodothiazole were nitrated to replace the 5-iodo group with a nitro group by adding it slowly to 80 cc. of fuming nitric acid (d. 1.5, 90%) at 0° C.–5° C. After standing at this temperature for 2 hours, the reaction mixture was allowed to come to room temperature and was then poured onto ice. The dark slurry resulting was made weakly basic with $NH_4OH$, filtered and the yellow solid recovered on the filter was washed well with water and dried. The yellow solid thus obtained weighed 10.6 grams (85%) and on crystallization from ethyl alcohol gave yellow needles of 2-acetamido-4-iodo-5-nitrothiazole melting at 245° C.–247° C.

Calculated: C—19.3; H—1.3; N—13.5; I—40.7; S—10.3. Found: C—19.21; H—1.48; N—12.92; I—39.05; S—9.94.

6.3 grams of the above 2-acetamido-4-iodo-5-nitrothiazole in 25 cc. of ethyl alcohol were refluxed 10 hours with 2.64 grams of sodium butylmercaptide in 75 cc. of ethyl alcohol under nitrogen. Partial concentration and filtration yielded 5.7 grams of crude 2-acetamido-4-butylmercapto-5-nitrothiazole which, when crystallized from ethyl alcohol and then from acetic acid, yielded 3.4 grams (62%) of pure 2-acetamido-4-butylmercapto-5-nitrothiazole in the form of yellow crystals melting at 213° C.–215° C.

Calculated: C—39.28; H—4.72; N—15.27; S—23.27. Found: C—39.45; H—4.78; N—14.88; S—23.08.

5.5 grams of 2-acetamido-4-butylmercapto-5-nitrothiazole obtained as described above were reacted with 16 grams of 30% $H_2O_2$ in 40 cc. of acetic acid, first at room temperature for 1 hour, and then at 80° C. for 2 hours. On cooling and filtering 5.7 grams (92%) of 2-acetamido-4-butylsulfonyl-5-nitrothiazole were obtained in the form of yellow needles. Upon recrystallization from aqueous ethyl alcohol the 2-acetamido-4-butylsulfonyl-5-nitrothiazole was obtained in the form of bright, pale yellow plates melting at 165° C.–167° C.

Calculated: C—35.18; H—4.27; N—13.67; S—20.85. Found: C—35.23; H—4.23; N—13.15; S—20.80.

The 2-acetamido-4-butylsulfonyl-5-nitrothiazole obtained as described above was hydrolyzed by refluxing with dilute aqueous methanolic HCl for 2 hours. Partial concentration of the reaction mixture yielded 2-amino-4-butylsulfonyl-5-nitrothiazole, a yellow solid.

EXAMPLE 2

By the use of an equivalent amount of sodium methylmercaptide, sodium ethylmercaptide and sodium n-propylmercaptide, respectively, for sodium butylmercaptide in Example 1 2-amino-4-methylsulfonyl-5-nitrothiazole, 2-amino-4-ethylsulfonyl-5-nitrothiazole and 2-amino-4-n-propylsulfonyl-5-nitrothiazole, respectively, are obtained.

EXAMPLE 3

6.3 grams of 2-acetamido-4-iodo-5-nitrothiazole from Example 1 in 25 cc. of ethyl alcohol was refluxed 10 hours with 1.5 grams of sodium methylmercaptide in 75 cc. of ethyl alcohol under nitrogen. Partial concentration and filtration yielded yellow crystals of 2-acetamido-4-methylmercapto-5-nitrothiazole. Crystallization from ethyl alcohol yielded 2.6 grams (70%) of the desired product (M. P. 237–39° C.).

The 2.6 grams of 2-acetamido-4-methylmercapto-5-nitrothiazole was reacted with 16 grams of 30% $H_2O_2$ in 40 cc. of acetic acid, first at room temperature for one hour and then at 80° C. for 2–3 hours. Cooling and filtering yielded 2.7 grams of 2-acetamido-4-methylsulfonyl-5-nitrothiazole as yellow crystals.

The 2-acetamido-4-methylsulfonyl-5-nitrothiazole obtained as described above was hydrolyzed by refluxing with dilute aqueous methanolic HCl for 2–3 hours. Partial concentration and filtration yielded yellow crystalline 2-amino-4-methylsulfonyl-5-nitrothiazole.

EXAMPLE 4

6.3 grams of 2-acetamido-4-iodo-5-nitrothiazole from Example 1 in 25 cc. of ethyl alcohol was refluxed 10 hours with 1.7 grams of sodium ethylmercaptide in 75 cc. of ethyl alcohol under a nitrogen atmosphere. Concentration to one-quarter of the original volume, followed by cooling and filtration, yielded 3.7 grams of yellow crystals of 2-acetamido-4-ethylmercapto-5-nitrothiazole. Crystallization from ethyl alcohol gave a melting point of 221–223° C.

The 3.7 grams of 2-acetamido-4-ethylmercapto-5-nitrothiazole was oxidized with $H_2O_2$ in acetic acid to the corresponding 2-acetamido-4-ethylsulfonyl-5-nitrothiazole in the same manner as described for the corresponding butyl compound in Example 1.

EXAMPLE 5

A. *Preparation of nitrosyl sulfuric acid*

1.52 grams of sodium nitrite were added portionwise, with vigorous stirring, to 10 cc. of concentrated sulfuric acid (95–96%) and the temperature of the reaction mixture was allowed to rise to 65° C. The resulting solution was then cooled to 5° C. and 20 cc. of a mixture of 3 cc. of n-propionic acid and 17 cc. of acetic acid were added dropwise, with stirring, while allowing the temperature to rise to 15° C. and maintaining it at this temperature during the remainder of the addition.

B. *Diazotization*

The nitrosyl sulfuric acid mixture prepared as described above was cooled to 0° C.–5° C. and then 5.3 grams of 2-amino-4-n-butylsulfonyl-5-nitrothiazole were added portionwise, while stirring, after which 20 cc. more of the n-propionic-acetic acid mixture described above were added while keeping the temperature of the reaction mixture at 0° C.–5° C. The reaction mixture thus obtained was then stirred at 0° C.–5° C. for 2 hours and the excess sodium nitrite present in the mixture was destroyed by adding 0.5 gram of urea. A clear diazonium solution was obtained.

C. *Coupling*

10 cc. of the 2-amino-4-n-butylsulfonyl-5-nitrothiazole diazonium solution prepared as described in B above were added, with stirring, at 0° C.–5° C. a solution of 0.78 gram of N,N-di-β-hydroxyethyl-m-toluidine in 7 cc. of 10% sulfuric acid cooled to 0° C. The coupling reaction which takes place was allowed to proceed for 15 to 30 minutes and then the reaction mixture was drowned in 200 cc. of water with stirring. After the reaction mixture thus obtained had stood for about 1 hour, the precipitated dye compound was recovered by filtration, washed well with water and dried. 1.35 grams (72%) of a dye compound having the formula:

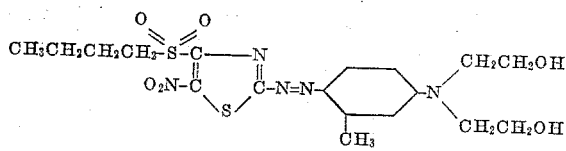

were thus obtained. It dyes cellulose acetate, wool, nylon and polyethylene terephthalate textile materials and textile materials made of the acrylonitrile graft polymer specifically described hereinafter bright greenish-blue shades. The dyeings obtained are fast to sublimation and washing, have excellent gas fastness, fair light fastness and discharge to a pure white.

EXAMPLE 6

A solution of 0.84 gram of $N$-$\beta,\gamma$-dihydroxypropyl-$N$-ethyl-$m$-toluidine in 7 cc. of 10% sulfuric acid was coupled with 10 cc. of the 2-amino-4-n-butylsulfonyl-5-nitrothiazole diazonium solution prepared as described in Example 5. Coupling and recovery of the dye compound formed were carried out in accordance with the procedure described in Example 5. 1.26 grams (65%) of a dye compound that colors cellulose acetate, wool, nylon and polyethylene terephthalate textile materials and textile materials made of the acrylonitrile graft polymer specifically described hereinafter deep greenish-blue shades were obtained. The dyeings obtained are fast to sublimation and washing, have excellent gas fastness, fair light fastness and discharge to a pure white.

EXAMPLE 7

10 cc. of the 2-amino-4-n-butylsulfonyl-5-nitrothiazole diazonium solution prepared as described in Example 5 were added, with stirring, to a finely divided suspension of 0.56 gram of 5,5-dimethylcyclohexanedione-1,3 in an acetic acid solution cooled to 5° C. The coupling reaction which takes place was allowed to proceed for 2 hours after which the reaction mixture was neutralized with sodium carbonate and drowned in water. The dye compound which precipitated was recovered by filtration, washed well with water and dried. 1.11 grams of a dye compound having the formula:

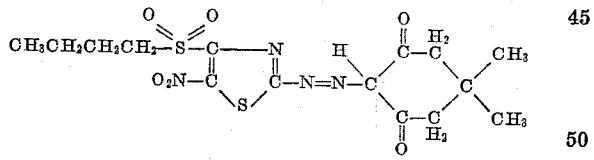

were obtained. It dyes cellulose acetate textile materials deep orange shades.

EXAMPLE 8

Ten cc. of a 2-amino-4-methylsulfonyl-5-nitrothiazole diazonium solution, prepared as described for the corresponding butyl compound in Example 5B, was added with the stirring at 0-5° C. to a solution of 0.5 gram of hydroquinone monomethyl ether in acetic acid cooled to 5° C. The coupling was allowed to proceed for 2 hours and then the mixture was neutralized with sodium carbonate. The reaction mixture was drowned in water, filtered, washed, and dried to yield 0.9 gram of dye having the formula:

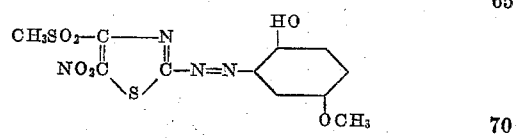

It dyes cellulose acetate textile materials deep, reddish orange shades.

The following tabulation further illustrates the compounds included within the scope of our invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure indicated hereinbefore.

| Amine | Coupling Component | Color |
| --- | --- | --- |
| 2-amino-4-methylsulfonyl-5-nitrothiazole. | 1. N,N - di - $\beta$ - hydroxy - ethylaniline. | blue. |
| Do | 2. N,N - di - $\beta$ - hydroxy - ethyl - m - toluidine. | greenish-blue. |
| Do | 3. N,N - di - $\beta$ - hydroxy - ethyl - m - chloroaniline. | violet blue. |
| Do | 4. N,N - di - $\beta$ - hydroxy - ethyl - 2 - methoxy - 5 - methylaniline. | blue green. |
| Do | 5. N,N - di - $\beta$ - hydroxy - ethyl - 2 - methoxy - 5 - chloroaniline. | Do. |
| Do | 6. N,N - di - $\beta$ - hydroxy - ethyl - m - acetylamino - aniline. | Do. |
| Do | 7. N,N - di - $\beta$ - hydroxy - ethyl - 2 - methoxy - 5 - acetylaminoaniline. | Do. |
| Do | 8. N,N - di - $\beta$ - hydroxy - propylaniline. | blue. |
| Do | 9. N,N - di - $\beta$ - hydroxy - propyl - m - toluidine. | greenish-blue. |
| Do | 10. N,N - di - $\gamma$ - hydroxy - propyl - m - toluidine. | Do. |
| Do | 11. N,N - di - $\delta$ - hydroxy - butyl - m - toluidine. | Do. |
| Do | 12. N - methyl - N - $\beta$ - hydroxyethylaniline. | blue. |
| Do | 13. N - ethyl - N - $\beta$-hydroxy-ethylaniline. | Do. |
| Do | 14. N - n - butyl - N - $\beta$ - hydroxyethyl - m - toluidine. | greenish-blue. |
| Do | 15. N - ethyl - N - $\beta$ - hydroxyethyl - m - toluidine. | Do. |
| Do | 16. N - ethyl - N - $\beta,\gamma$ - dihydroxypropyl - m - toluidine. | Do. |
| Do | 17. N - ethyl - N - $\beta$ - hydroxyethyl - m - bromo - aniline. | violet. |
| Do | 18. N - n - propyl - N - $\beta$ - hydroxyethyl - m - toluidine. | greenish-blue. |
| Do | 19. N - isopropyl - N - $\beta$ - hydroxyethyl - m - toluidine. | Do. |
| Do | 20. N - n - butyl - N - $\beta$ - hydroxyethyl - m - toluidine. | Do. |
| Do | 21. N - isobutyl - N - $\beta,\gamma$ - dihydroxypropyl - m - acetylaminoaniline. | blue green. |
| Do | 22. N - $\beta$ - cyanoethyl - N-$\beta$-hydroxyethylaniline. | violet. |
| Do | 23. N - $\beta$ - cyanoethyl - N - $\beta,\gamma$ - dihydroxypropylaniline. | Do. |
| Do | 24. N - $\beta$ - carbomethoxy - ethyl - N - $\beta$ - hydroxy - ethylaniline. | Do. |
| Do | 25. N - $\beta$ - carboethoxy - ethyl - N - $\beta$ - hydroxy - ethylaniline. | Do. |
| Do | 26. N-ethyl-N-$\beta$-hydroxy-propyl - m - toluidine. | greenish-blue. |
| Do | 27. N - 2,2 - difluoroethyl - N - $\beta$ - hydroxyethylaniline. | violet. |
| Do | 28. N - 2,2 - difluoroethyl - N - $\beta$ - hydroxyethyl - m - toluidine. | Do. |
| Do | 29. N - 2,2,2 - trifluoro - ethyl - N - $\beta$ - hydroxy - ethylaniline. | red violet. |
| Do | 30. N - 2,2,2 - trifluoro - ethyl N-$\beta$-hydroxyethyl-m-toluidine. | violet. |
| Do | 31. N - 2,2 - difluoropropyl - N - $\beta$ - hydroxyethyl - m - toluidine. | violet blue. |
| Do | 32. N - 3,3 - difluoropropyl - N - $\beta$ - hydroxyethyl - m - toluidine. | Do. |
| Do | 33. N - 3,3 - difluorobutyl - N - $\beta$ - hydroxyethyl - m - toluidine. | Do. |
| Do | 34. N - 4,4 - difluoroamyl - N - $\beta$ - hydroxyethyl - aniline. | blue. |
| Do | 35. N - 3,3,3 - trifluoro propyl - N - $\beta$ - hydroxy - ethyl - m - toluidine. | violet. |
| Do | 36. N-4,4,4-trifluorobutyl-N - $\beta$ - hydroxyethyl - m - toluidine. | violet blue. |
| Do | 37. N - methylaniline | violet. |
| Do | 38. N - n - butylaniline | Do. |
| Do | 39. N - $\beta$ - hydroxyethyl - aniline. | Do. |

| Amine | Coupling Component | Color |
|---|---|---|
| 2-amino-4-methylsulfonyl-5-nitrothiazole. | 40. N-β,γ-dihydroxypropylaniline. | violet. |
| Do | 41. N-β-cyanoethylaniline. | red-violet. |
| Do | 42. N-β-methoxyethylaniline. | violet. |
| Do | 43. N-β-ethoxyethylaniline. | Do. |
| Do | 44. N-β-methoxyethyl-N-β-hydroxyethylaniline. | blue. |
| Do | 45. N-β-ethoxyethyl-N-β-hydroxyethylaniline. | Do. |
| Do | 46. 2,5-dimethoxyaniline. | violet. |
| Do | 47. 2,5-diethoxyaniline. | Do. |
| Do | 48. 2-methoxy-5-chloroaniline. | Do. |
| Do | 49. 2-methoxy-5-bromoaniline. | Do. |
| Do | 50. resorcinol monomethyl ether. | reddish orange. |
| Do | 51. resorcinol monoethyl ether. | Do. |
| Do | 52. resorcinol mono-n-butyl ether. | Do. |
| Do | 53. hydroquinone monomethyl ether. | Do. |
| Do | 54. hydroquinone mono-n-butyl ether. | Do. |
| Do | 55. catechol monomethyl ether. | Do. |
| Do | 56. catechol mono-n-butyl ether. | Do. |
| Do | 57. p-cresol. | yellow-orange. |
| Do | 58. resorcinol. | orange. |
| Do | 59. catechol. | Do. |
| Do | 60. N-β-hydroxyethyl-m-n-propionylaminoaniline. | blue. |
| Do | 61. N,N-di-β-hydroxyethyl-m-n-butylrylaminoaniline. | blue-green. |
| Do | 62. cyclohexanedione-1,3. | yellow-orange. |
| Do | 63. 5-methylcyclohexanedione-1,3 | orange. |
| Do | 64. 5,5-dimethylcyclohexanedione-1,3. | Do. |
| Do | 65. N-ethyl-N-β-hydroxypropyl-m-toluidine. | greenish-blue. |

When 2-amino-4-ethylsulfonyl-5-nitrothiazole, 2-amino-4-n-propylsulfonyl-5-nitrothiazole, 2-amino-4-isopropylsulfonyl-5-nitrothiazole and 2-amino-4-n-butylsulfonyl-5-nitrothiazole, respectively, are diazotized and the diazonium compounds obtained are coupled with each of the coupling components (1–65) set forth in the above tabulation, monoazo compounds of our invention are obtained which color cellulose acetate substantially the same shade as the corresponding monoazo dye obtained from diazotized 2-amino-4-methylsulfonyl-5-nitrothiazole. To illustrate, the monoazo compound prepared from diazotized 2-amino-4-n-butylsulfonyl-5-nitrothiazole and N,N-di-β-hydroxypropyl-m-toluidine colors cellulose acetate a greenish-blue as does the corresponding monoazo compound prepared from diazotized 2-amino-4-methylsulfonyl-5-nitrothiazole and N,N-di-β-hydroxypropyl-m-toluidine.

*Preparation of acrylonitrile graft polymer*

3.0 g. of acrylonitrile and 7.0 g. of N-methyl methacrylamide were emulsified in 40 cc. of water containing 0.15 g. of potassium persulfate and 0.01 g. of tertiary dodecyl mercaptan. The emulsion was heated at 60° C. until 94% or more of the monomers had copolymerized. This result is usually accomplished by heating for about 12 hours. The copolymer contained approximately 30% by weight of acrylonitrile and 70% by weight of N-methyl methacrylamide. The mixture was then cooled to room temperature, 50 cc. of water added and the mixture agitated until a homogeneous solution of dope containing 10% by weight of the copolymer resulted.

30.7 g. (3.07 g. of copolymer) of the above prepared solution or dope of the copolymer were placed in a jacketed reactor provided with an agitator and heat exchanger. There were then added 10 g. of acrylonitrile, 114 cc. of water, 0.58 g. of 85% phosphoric acid, 0.1 g. of potassium persulfate, 0.17 g. of potassium metabisulfite, 0.1 g. of tertiary dodecyl mercaptan and 0.56 g. of a 30% solution in water of N-methyl methacrylamide and the mixture heated, with stirring, to 35° C. and then allowed to level off at 37°–39° C. After the heat of polymerization had been removed and when the conversion of the acrylonitrile to polymer had reached 96% or more, which is usually accomplished in a period of about 12 hours, the temperature was raised to 90° C. The mother liquor was removed by centrifuging the polymerization mixture, the polymer precipitate being reslurried twice with water and centrifuged to a 70% moisture cake. The cake was dried under vacuum at 80° C. in an agitated dryer. The over-all yield of modified polyacrylonitrile product was over 90%. After hammer-milling, the dry powder, now ready for spinning, was stored in a moisture proof container.

The acrylonitrile graft polymer prepared as above and containing about 18% by weight of N-methyl methacrylamide was soluble in N,N-dimethylformamide. Fibers spun by extruding a solution of the polymer product in N,N-dimethylformamide into a precipitating bath had a softening temperature of about 240° C., an extensibility of about 20–30 percent depending on the drafting and relaxing conditions, and showed excellent affinity for dyes.

The monoazo dye compounds of our invention can be applied to cellulose alkyl carboxylic acid esters having 2 to 4 carbon atoms in the acid groups thereof, nylon, wool, acrylonitrile graft polymers, and polyester, such as polyethylene terephthalate, textile materials in the form of an aqueous dispersion and are ordinarily so applied. To illustrate, the dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximating 45° C.–55° C. and the textile material to be dyed is immersed in the dye bath, following which the temperature is gradually raised to 80° C.–90° C. and maintained at this temperature until dyeing is complete, usually one-half to two hours. From time to time throughout the dyeing operation, the material is worked to promote even dyeing. Upon completion of the dyeing operation, the textile material is removed from the dye bath, washed with an aqueous soap solution, rinsed well with water and dried.

In the case of certain of the acrylonitrile graft polymers described hereinbefore it is necessary to dye at the boil for an extended period of time. Instances may be encountered where the fiber is not satisfactorily colored by the dyeing procedure just described. In these instances special dyeing techniques, such as the use of pressure, for example, developed by the art for the coloration of materials difficult to color may be employed.

Widely varying amounts of dye can be used in the dyeing operation. The amount of dye used can be, for example, ⅓ to 3% (by weight) of that of the textile material although lesser or greater amounts of the dye can be employed.

The following example illustrates one satisfactory way in which the fibers of the acrylonitrile graft polymers can be dyed using the azo compounds of our invention. 16 milligrams of dye are ground with an aqueous solution of sodium lignin sulfonate until well dispersed or alternately the dye can be dissolved in 5 cc. of hot Cellosolve (i. e. ethylene glycol monoethyl ether). The dispersion or solution, as the case may be, is then poured into 150 cc. of water to which a small amount of a surface-active agent such as Igepon T

Nekal BX (sodium alkylnaphthalenesulfonate) or Orvus (sodium lauryl sulfate-type) has been added. The dye bath is then brought to the desired temperature and 5 grams of well wet-out fibers of the graft polymer are added thereto. Dyeing is continued until the proper shade is reached. From time to time throughout the dyeing operation, the material is worked to promote even dyeing.

Acrylonitrile graft polymers including those of the type specifically described hereinbefore are described and claimed in Coover U. S. application Serial No. 408,012 filed February 3, 1954.

We claim:

1. The monoazo compounds which are free of water-solubilizing groups and which have the formula:

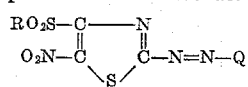

wherein R represents an alkyl group having 1 to 4 carbon atoms and Q represents the radical of a cyclohexanedione-1,3 compound joined to the azo bond through the carbon atom in its 2-position.

2. The azo compound having the formula:

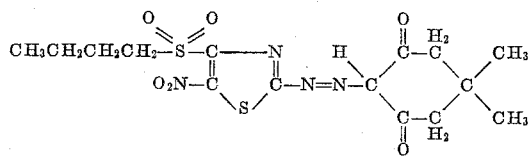

3. The azo compound having the formula:

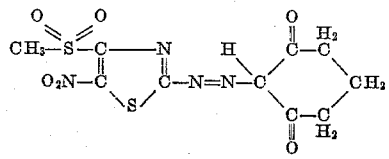

4. The azo compound having the formula:

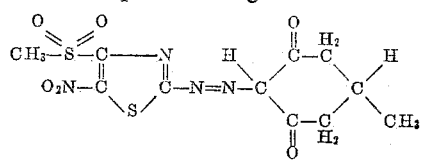

5. The azo compound having the formula:

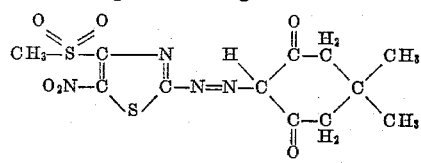

References Cited in the file of this patent

UNITED STATES PATENTS

| | | |
|---|---|---|
| 2,149,051 | Helberger et al. | Feb. 28, 1939 |
| 2,345,010 | Seymour et al. | Mar. 28, 1944 |
| 2,619,489 | Horlein | Nov. 25, 1952 |
| 2,659,719 | Dickey et al. | Nov. 17, 1953 |
| 2,690,443 | Parker | Sept. 28, 1954 |
| 2,708,671 | Towne | May 7, 1955 |
| 2,709,172 | Dodson | May 24, 1955 |